(12) United States Patent
Borglum et al.

(10) Patent No.: US 6,314,996 B1
(45) Date of Patent: Nov. 13, 2001

(54) FOAM MARKING SYSTEM

(75) Inventors: Richard P. Borglum; Anthony R. Borglum; Corey W. Cerwinske, all of Nashua, IA (US)

(73) Assignee: Richway Industries, Ltd., Janesville, IA (US)

( * ) Notice: Subject to any disclaimer, the term of this patent is extended or adjusted under 35 U.S.C. 154(b) by 0 days.

(21) Appl. No.: 09/626,031

(22) Filed: Jul. 27, 2000

(51) Int. Cl.[7] .................... B01F 15/02; G05D 11/02
(52) U.S. Cl. ................. 137/565.29; 366/181.8; 366/182.2
(58) Field of Search ............... 137/565.29; 366/160.3, 366/181.8, 182.2

(56) References Cited

U.S. PATENT DOCUMENTS

| | | | |
|---|---|---|---|
| 3,164,374 | * | 1/1965 | Ralph ........................ 366/182.2 X |
| 3,319,937 | * | 5/1967 | Wilson et al. ................ 366/181.8 |
| 3,424,439 | * | 1/1969 | Baker ........................ 366/181.8 |
| 3,912,234 | * | 10/1975 | Peter ......................... 366/262 |
| 4,090,695 | * | 5/1978 | Stone et al. .................. 366/76.2 |
| 4,296,875 | * | 10/1981 | Borglum ...................... 222/617 |
| 5,031,834 | | 7/1991 | Simpson ...................... 239/172 |
| 5,133,500 | | 7/1992 | Simpson ...................... 239/150 |

\* cited by examiner

Primary Examiner—John Rivell
(74) Attorney, Agent, or Firm—Zarley, McKee, Thomte, Voorhees & Sease

(57) ABSTRACT

A foam marking system is provided with separate tanks for water and foam concentrate. A water pump and a concentrate pump deliver water and concentrate from the respective tanks to a mixing chamber at a pre-selected ratio. The water pump is controlled by a master control, while the concentrate pump is controlled by a slave control depending from the master control. The master control generates and output signal which is sent to both the water pump and the slave control, such that the slave control and concentrate pump operate as a function of the master control and water pump, so that the selected mix ratio can be maintained, regardless of the output level of the foam from the system. A foam generation chamber connected to the mixing chamber and to an air source generates foam when the foam solution is mixed with air.

20 Claims, 3 Drawing Sheets

FOAM MARKING SYSTEM

BACKGROUND OF THE INVENTION

Foam marking systems are well known in the agricultural industry for marking passes through a field so that subsequent passes will not overlap or be spaced from previous passes. Such conventional foam marking machines utilize a large tank wherein the foaming agent is mixed with water to create a foam solution. The solution is then mixed with air to produce a detergent-type foam which is dropped off the end of an agricultural sprayer boom periodically to leave a path to follow on the next pass through the field. The foam path prevents overlapping or gaps, both of which are detrimental to crop yield.

Air, water and foam concentrate are the three primary components for foam generation. In most prior art systems, the air supply is constant. The mixed solution for water and foam concentrate typically ranges between 32:1 to 256:1. This mix ratio is dependent upon several variables to achieve optimum foam delivery, including ambient temperature, water temperature, water hardness, and foam concentration.

Several problems exist with conventional prior art foam marking systems. First, the systems require a large, usually heavy, tank mounted on the sprayer to hold the mixed water and foam solution. Secondly, the operator must mix the foaming agent in water to achieve the desired quality of foam solution, which is often difficult due to the variables which affect the foam quality. Also, many operators do not carefully measure the water and foam concentrate when making the solution, resulting in foam solutions which may be too stiff or too wet for a particular application.

Another problem in prior art foam marking systems which utilize pre-mixed or pre-diluted foam solutions is the use of hard water. In such pre-mixed solutions, the calcium and magnesium ions present in most water sources react with certain ingredients in the foam concentrate, thereby precipitating active ingredients which reduce the performance of the foam marking system. The precipitation effects increase gradually over time, making the pre-mix or pre-dilute systems unsatisfactory, particularly as the time between mixing the solution and generating the foam increases.

Accordingly a primary objective of the present invention is the provision of an improved foam marking system which overcomes the problems of the prior art.

Another objective of the present invention is the provision of a foam marking system wherein the sprayer carriers separate smaller tanks for the foam concentrate and water, with a small mixing chamber to provide a desired mixed solution.

A further objective of the present invention is the provision of a foam marking system wherein the mix ratio is maintained constant regardless of the volume of foam generated.

Another objective of the present invention is the provision of a foam marking system wherein the foam solution is mixed on the go in the field as the sprayer is operated.

Another objective of the present invention is the provision of a foam marking system wherein the mixing of the water and foam concentrate is adjustable via separate pumps for each liquid, with each pump being controlled with a pulse width modulation electronic circuit.

A further objective of the present invention is the provision of a foam marking system which maintains a linear relationship between the water and foam concentrate at all foam output levels.

Another objective of the present invention is the provision of an improved method of generating a foam marker.

A further objective of the present invention is the provision of an improved foam marking system which eliminates or avoids the precipitation effects of hard water interacting with foam concentrate.

Still another objective of the present invention is the provision of a foam marking system which enables the operator to vary the composition of the resultant foam to meet the needs of the operating conditions at the time of spraying.

These and other objectives will become apparent from the following description of the invention.

SUMMARY OF THE INVENTION

A foam marking system is provided with a fresh water tank and a separate foam concentrate tank. A mixing chamber is also provided for receiving and mixing water and foam from each of the tanks, as supplied by first and second pumps, respectively, to create a foam solution. The pumps are adjustable and controlled by separate pulse width modulators. The primary control sends an output signal to both the water pump and a slave control unit, which in turn sends a signal to the foam concentrate pump. Thus, the marking system maintains a linear relationship between the water and foam concentrate at all foam output levels, since the slave control unit for the concentrate pump operates as a function of the master control for the water pump.

DETAILED DESCRIPTION OF THE DRAWINGS

Figure 1:
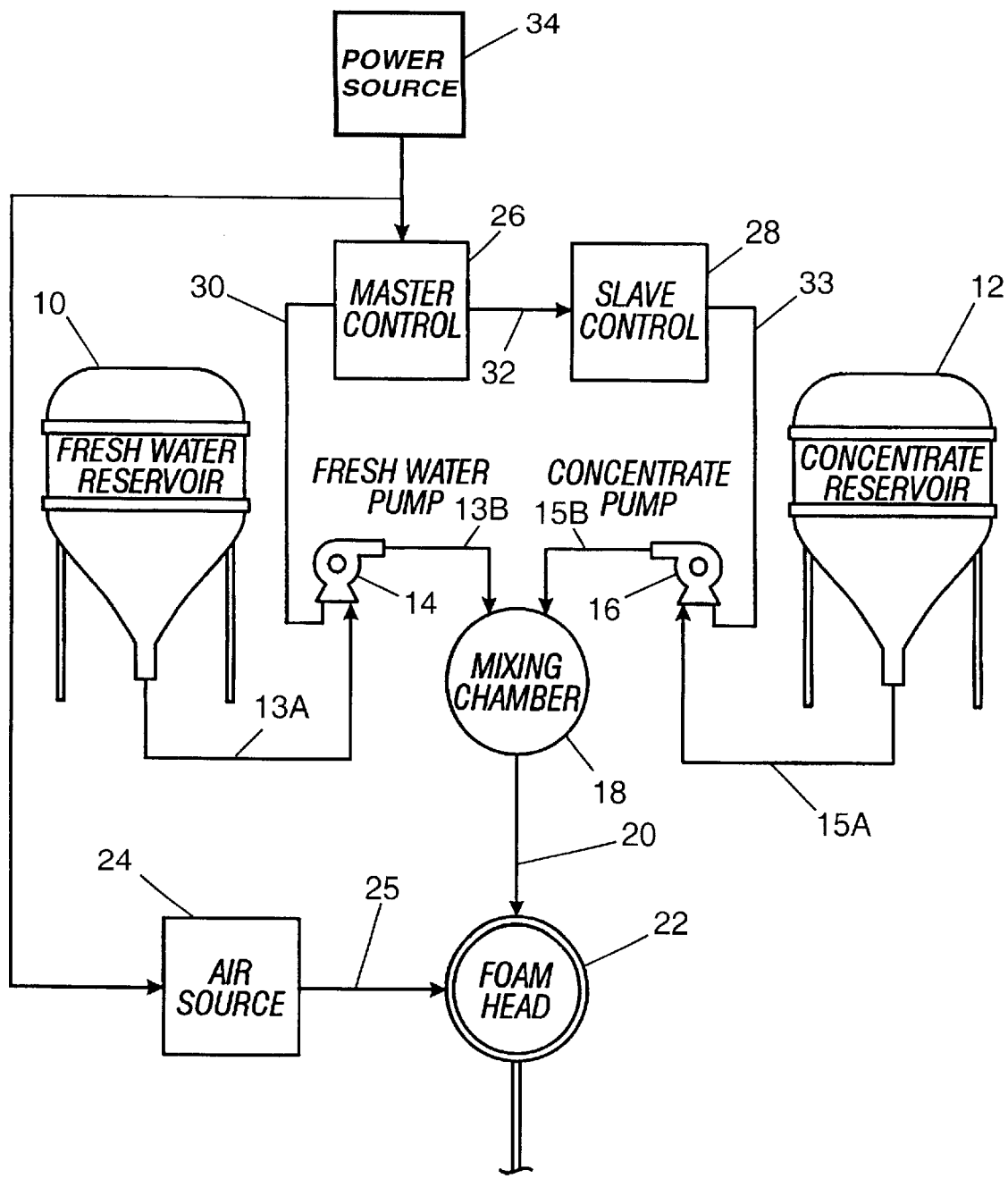
FIG. 1 is a schematic view of the foam marking system of the present invention.

The foam marking system of the present invention is particularly adapted for use in marking agricultural fields when spraying fertilizers, herbicides, insecticides, other chemicals, and the like. The system is adapted for use on an agricultural sprayer, but it is understood that the system can be utilized for other solution metering applications and in other environments, without departing from the scope of the invention.

The system of the invention generally includes a fresh water reservoir or tank 10 and a separate foam concentrate reservoir or tank 12. Separate pumps 14, 16 deliver water and foam concentrate, respectively, from the tanks 10, 12, via fluid lines 13A, 13B, 15A, 15B, respectively, into a mixing chamber 18 to create a foam solution with a desired mix ratio. A hose 20 leads from the mixing chamber 18 to a foam head or generation chamber 22. The foam generation chamber 22 is also connected to a pressurized air source 24, via air line 25. Air from the air source 24 is combined with foam solution from the mixing chamber 18 in the foam generation chamber 22 to generate foam. The air source 24 may be a dedicated electric powered air compressor associated with the foam marking system itself, or a compressor driven by the engine of the vehicle, such that the compressor output can be used for other purposes, in addition to providing air mixing with the foam solution in the foam generation chamber 22.

In the agricultural use, the foam is dispensed at the end of the sprayer to mark each pass through the field.

Preferably, the pumps 14, 16 are adjustable peristaltic pumps which dynamically meter and inject the water and foam concentrate, respectively, into the mixing chamber 18. Other positive or semi-positive displacement pumps, such as a diaphragm pump, or metering devices could also be used. Operation of the water pump 16 is controlled by a master control 26. Operation of the concentrate pump 16 is controlled by a secondary or slave control 28 depending from the master control 26. Preferably, each of the master and slave controls 26, 28 include a pulse width modulation speed control circuit. Both circuits can be varied by means of potentiometers. As an alternative to the pulse width modulators, rheostats can be used, with the master control rheostat generating an input signal for both the water pump 14 and the slave control 28 which controls the foam concentrate pump 14. The output from the master control 26 is split so as to provide power to the water pump 14, as indicated by line 30 in FIG. 1, and to provide input to the slave control 28, as represented by line 32 in FIG. 1. The slave control 28 provides input to the concentrate pump, as represented by line 33 in FIG. 1.

Thus, while the mix ratio of water and foam concentrate can be selectively varied by the operator, once the ratio is set, the system will maintain the selected ratio, regardless of the volume output from the foam generation chamber 22. Accordingly, a desired quality of foam can be applied, regardless of changing variables, such as foam volume, and ambient temperature. For example, as the air temperature increases, the operator can increase the ratio of the foam concentrate to water, which increases the length of time that the generated foam remains visible.

From the remote operator's seat in the vehicle or tractor pulling the sprayer, the operator can actuate a power source 34 to provide power to the system. The operator can observe the foam and make adjustments in the mix ratio on the go from the cab of the vehicle, as needed, to achieve the desired foam quality and consistency.

Accordingly, with the foam marking system of the present invention, both the foam output and the mix ratio can be adjusted, with the mix ratio being integrated with the foam output control so as to maintain a linear relationship between the water and foam concentrate at all foam output levels. The system allows the operator to precisely tune the marking system to specific applications, while eliminating the foam mixing variables, such as ambient temperature, water temperature, water hardness, and foam concentration. Therefore, the spraying operation can be operated without interruption while the operator makes adjustments to the foam marking system.

Figure 2:
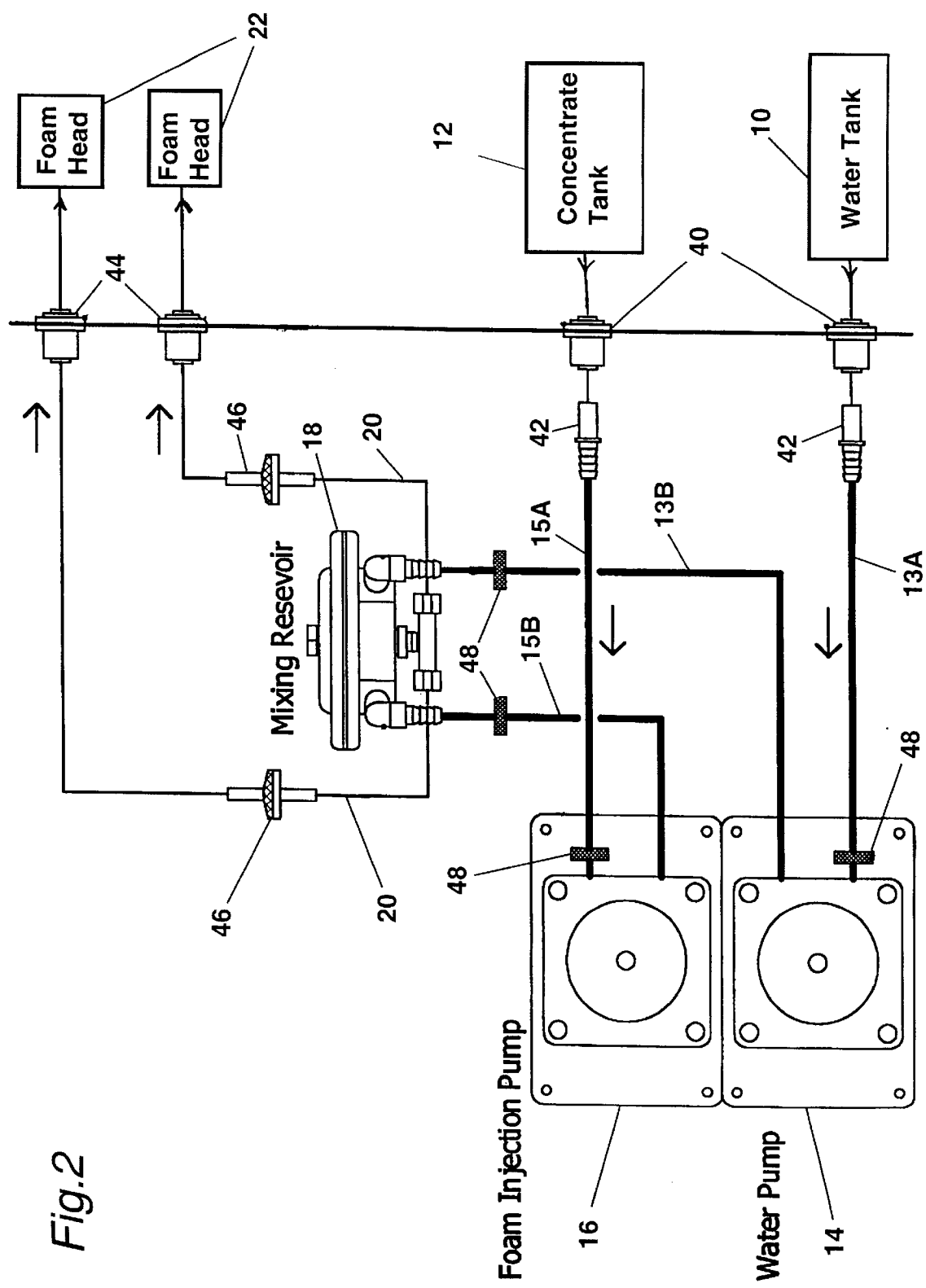
FIG. 2 is a schematic view of the liquid circuitry of one embodiment of the present invention.

FIG. 2 is a schematic view showing one embodiment of the circuitry for the liquid components for the foam marking system of the present invention. More particularly, the liquid circuitry includes conventional bulk head unions 40 for the fluid lines 13A, 13B, 15A, and 15B. Conventional tube stems 42 may be provided for facilitating the connection of fluid lines 13A, 15A to the bulk head unions 40. Bulk head unions 44 are provided for the fluid lines 20. As shown in FIG. 2, the mixing reservoir 18 has two outputs leading to dual foam generating chambers 22 via lines 20. The dual foam generating chambers 22 may be located at opposite ends of a spray boom. Conventional check valves 46 are provided in the fluid lines 20. Conventional tube clamps 48 are also provided on lines 13A, 13B, 15A, 15B, as shown in FIG. 2.

Figure 3:
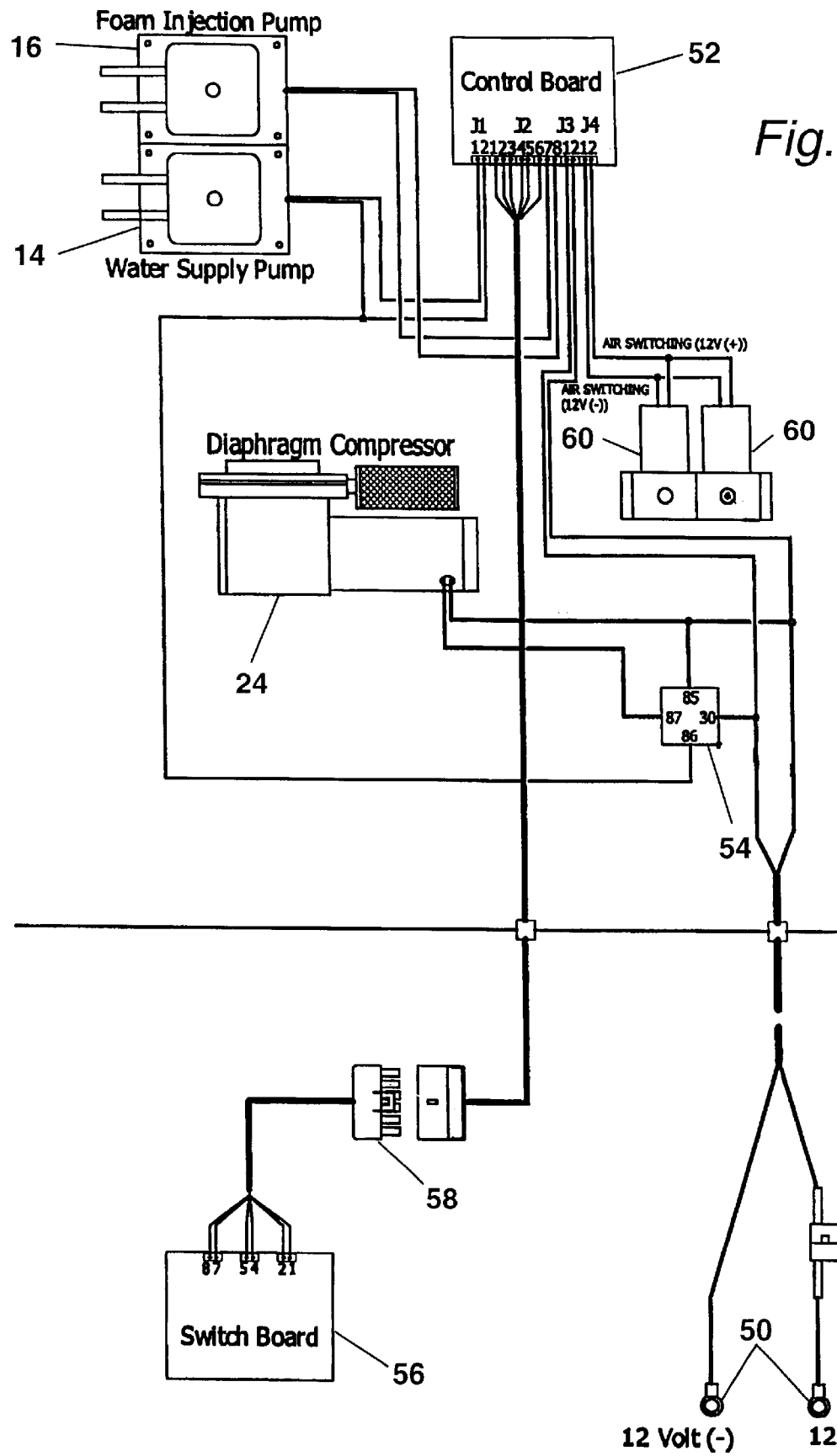
FIG. 3 is a schematic view of the electrical circuitry of one embodiment of the present invention.

FIG. 3 shows one embodiment of the electrical circuitry for the present invention. Leads 50 are connected to the power source 34, such as a 12 volt battery, so as to provide power to a control board 52 and the air source 24. A conventional power relay 54 is provided in the electrical circuitry to the air source 24. The control board 52 is electrically connected to a switch board 56, with a conventional six pin connector 58. The control board 52 is also electrically connected to the water pump 14 and the foam concentrate pump 16. Conventional air switching valves are also electrically connected to the control board 52, and control the flow of air from the air source 24 to the dual foam generation chambers 22 shown in FIG. 2.

It is understood that the adjustable metering system described above for foam marking can also be used without the foam generation chamber 22 and air source 24 so that a solution with a desired mix ratio of water and additive, such as fertilizer, insecticide, or herbicide, can be sprayed on the field. Such a sprayer system functions and operates similar to the foam marking system described above, without generating a foam.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A foam marking system for generating a foam mark in a field, comprising:
   a fresh water tank;
   a foam concentrate tank;
   a mixing chamber for receiving fresh water and foam concentrate from each of the tanks to create a foam solution;
   a first pump for pumping water from the water tank to the mixing chamber;
   a second pump for pumping foam concentrate from the concentrate tank to the mixing chamber;
   an electrical link between the first and second pumps so as to maintain a constant mix ratio between the water and foam concentrate.

2. The system of claim 1 wherein the electrical link comprises a master circuit and a slave circuit, with the master circuit providing a first output to the first pump and the second output to the slave circuit, and with the slave circuit being coupled to the second pump.

3. The system of claim 2 wherein the master circuit and slave circuit each include a pulse width modulator.

4. The system of claim 2 wherein the master circuit and slave circuit each include rheostats.

5. The system of claim 1 further comprising a foam generation chamber operatively connected to the mixing chamber and an air source connected to the foam generation chamber for generating foam from the foam solution.

6. A method of generating a foam marker, comprising:
   providing a source of water;
   providing a source of foam concentrate;
   separately metering water from the water source and concentrate from the concentrate source into a mixing chamber to form a mixture;
   controlling the metering of the water with a master control;
   controlling the metering of the concentrate with a slave control depending from the master control;
   sending an output from the master control to the slave control such that the metering of the water and concentrate maintains a constant mix ratio of the water and concentrate; and supplying the mixture to a foaming generation chamber connected to an air source to generate a foam.

7. The method of claim 6 wherein the control of the metering of the water and concentrate is accomplished using pulse width modulation.

8. The method of claim 6 wherein the control of the metering of the water and concentrate is accomplished using rheostats.

9. A metering system for two liquids used in generating foam, comprising:

a source of a first liquid;

a source of a foam concentrate;

a mixing chamber to receive the first liquid and the foam concentrate to create a mixture thereof;

a first pump for pumping the first liquid to the mixing chamber;

a second pump for pumping the foam concentrate to the mixing chamber;

a control for operating the pumps such that operation of the second pump is a function of operation of the first pump.

10. The system of claim 9 wherein the control includes a master control and a slave control, with the master control sending an output signal to the first pump and sending an input signal to the slave control, and the slave control sending an output signal to the second pump corresponding to the input signal from the master control.

11. system of claim 10 wherein the master and slave controls each include a pulse width modulator for generating the output and input signals.

12. The system of claim 10 wherein the master and slave controls each include rheostats for generating the output and input signals.

13. The system of claim 9 further comprising a foam generation chamber connected to the mixing chamber, and a source of pressurized air coupled to the foam generation chamber to generate foam from the mixture in the foam generation chamber.

14. A method of generating a foam marker, comprising:

pumping water from a water tank to a mixing tank;

pumping foam concentrate from a concentrate tank to the mixing tank to provide a foam solution; and electrically controlling the pumping to maintain a constant mix ratio between the water and the foam concentrate.

15. The method of claim 14 further comprising applying an air stream to the foam solution to create a foam.

16. The method of claim 15 further comprising applying the foam as a marker.

17. The method of claim 16 wherein the step of electrically controlling is performed using pulse width modulation.

18. The method of claim 14 wherein the pumping steps are performed by separate pumps.

19. The method of claim 18 wherein one pump is a master pump and one pump is a slave pump.

20. The method of claim 18 wherein the pumps are operatively connected as master and slave pumps.

* * * * *